United States Patent
Hyland

Patent Number: 5,129,795
Date of Patent: Jul. 14, 1992

[54] MOTOR DRIVEN PUMP

[75] Inventor: George J. Hyland, Blue Bell, Pa.

[73] Assignee: Powerdyne Corporation, Carson City, Nev.

[21] Appl. No.: 708,360

[22] Filed: May 31, 1991

[51] Int. Cl.$^5$ .................. F04B 39/06; F04D 29/04
[52] U.S. Cl. .................. 417/423.12; 417/366; 417/370; 415/169.1; 415/116; 415/115
[58] Field of Search .................. 417/423.12, 365, 366, 417/369, 370; 415/169.1, 115, 116, 104, 105, 106, 107; 310/90.5

[56] References Cited

U.S. PATENT DOCUMENTS

| | | | |
|---|---|---|---|
| 1,610,454 | 12/1926 | Lawaczeck | 417/365 |
| 2,042,533 | 6/1936 | Kieser | 417/365 |
| 2,700,343 | 1/1955 | Pezzillo | 417/365 |
| 2,713,311 | 7/1955 | White | 417/357 |
| 2,799,227 | 7/1957 | Allen | 415/104 |
| 2,871,790 | 2/1959 | Litzenberg | 417/370 |
| 2,906,208 | 9/1959 | White | 417/357 |
| 3,053,189 | 9/1962 | White | 417/357 |
| 3,135,211 | 6/1964 | Pezzillo | 417/365 |
| 3,220,349 | 11/1965 | White | 417/365 |
| 3,220,350 | 11/1965 | White | 417/365 |
| 3,967,915 | 7/1976 | Litzenberg | 415/104 |
| 4,013,389 | 3/1977 | Oikawa | 415/115 |
| 4,057,369 | 11/1977 | Isenberg | 415/107 |
| 4,065,231 | 12/1977 | Litzenberg | 417/365 |
| 4,082,376 | 4/1978 | Wehoe et al. | 310/90.5 |
| 4,115,038 | 9/1978 | Litzenberg | 417/723.12 |
| 4,648,808 | 3/1987 | Havenstein | 415/106 |
| 4,764,085 | 8/1988 | Jesinger | 310/90.5 |
| 4,948,348 | 8/1990 | Doll et al. | 417/723.12 |
| 4,990,068 | 2/1991 | Zhong | 417/723.12 |
| 5,009,578 | 4/1991 | Myland | 417/365 |

FOREIGN PATENT DOCUMENTS 927199  5/1973  Canada .................. 417/723.12

Primary Examiner—Richard A. Bertsch
Assistant Examiner—Peter Korytnyk
Attorney, Agent, or Firm—Z. T. Wobensmith, III

[57] ABSTRACT

A motor driven pump of the canned or isolated stator type wherein pressure regulation of fluid control for motor cooling and magnetic thrust balancing of the motor rotor are independent of each other.

4 Claims, 4 Drawing Sheets

MOTOR DRIVEN PUMP

BACKGROUND OF THE INVENTION

1≠. Field of the Invention

This invention relates to motor driven pumps of the canned or isolated stator type, with magnetic thrust balancing and independently controlled fluid flow for cooling.

2. Description of the Prior Art

Motor driven pummps having motor stators in which the stator electrical windings are isolated from the pumped fluids, are called "canned" motor pumps and are well known in the art. Such pumps are often utilized where hot, corrosive, toxic and expensive fluids are handled, and are most desired because they eliminate rotating seals and stuffing boxes which connect the hydraulic or pumping apparatus to a motor, which could leak fluids to the atmosphere and cause hazardous conditions and expense.

Such pumps are often in continuous use while handling hot fluids, which causes rapid heat build up and subsequent damage to the electrical components of the pumps.

All electric motors require cooling to properly perform, and most standard motors have built-in fans to provide cooling. A pumnp that has a canned motor stator which is hermetically sealed cannot be cooled in this fashion and, therefore, the practice has been to divert some of the fluid that is being handled so that it is recirculated through the motor betwen the rotor and canned stator where it draws the heat away. This design is exemplified in the U.S. Patents to White, U.S. Pat. No. 2,906,208; and to Litzenberg, U.S. Pat. Nos. 2,871,791 and 4,065,237.

Other designs use external fluid circulation, as illustrated in the U.S. Patents to White, U.S. Pat. Nos. 2,713,311; and 3,053,189; and 3,114,090.

Canned motor pumps that utilize internal fluid circulation depend upon the clearance between the rotor and stator as an orifice for controlling the amount of fluid flow through the motor section. The following difficulties arise from this method of fluid control:

1. The variances in the manufacturing tolerances which constitute this fluid gap are of such a magnitude that either more or less of the desired flow is obtained;
2. The rotor and stator of a canned motor pump vary in length depending upon the horsepower of the pump, and this results in an unstable and unpredictable volume of fluid; and
3. The fluid pressure developed in the volute section is completely variable due to the operating conditions, and coupled with 1 and 2 above does not provide an accurate flow for the purpoase of cooling the motor.

Fluid flow for the purpose of stator cooling must vary with the horsepower developed by the motor, too much causes a drop in efficiency of the pump and too little will reduce the service life of the pump. For example, extensive tests have established that 3 GPM of room temperature fluid is required to properly cool the stator section in a 3 HP motor. Any more fluid is unnecessary and seriously affects the hydraulic efficiency of the unit, and any less may be detrimental to the service life of the motor windings. Tests on hundreds of production units have positively demonstrated, that due to the conditions stated above, the use of the clearance between the rotor and stator sections for fluid flow does not control the fluid flow in a satisfactory manner.

The utilization of an orifice of predeterminined size will provide the proper fluid flow control, but this orifice must be sized for the individual horsepower and motor cooling requirements of the pumps and is not adjustable. The fixed orifice is mounted in a plate that has no other openings of consequence from the pump chamber to the stator and rotor section. The orifice is a control orifice to permit the fluid flow to continue to the hollow shaft, which returns recirculated fluid to suction or to the impeller. While this orifice eliminates the deviations that arise from the use of the gap between the rotor and stator as a metering medium for cooling or other purposed, it does not properly control fluid flow for thrust balancing.

In addition with certain high temperature applications, the flow of fluid from that being pumped for cooling must be capable of being cut off if external cooling of the pump is required.

Another problem which arises with canned pumps is that it is difficult to determine if the pump impeller is rotating in the correct direction. If the impeller is not rotating in the correct direction, fluid flow may be 75% of the desired head and damage could result to the pump.

An additional problem of thrust balancing the rotor of canned pumps, is that it is dependent on cooling fluid flow.

Since canned motor driven pumps of the type described use the clearance between the rotor and stator as a variable orifice for controlling fluid flow, they are very sensitive to electrical forces which tend to center the rotor, and make thrust balancing difficult, since the volume of fluid going through the orifice between the rotor and isolated stator and through the bearing varies and can seriosly affect the thrust balance.

The pressure of the pumped fluid is used to operate and control the axial thrust balance of the rotating parts, both electrical hand hydraulic. In a single stage closed impeller of a centrifugal pump, a forward thrust is developed due to the differential pressues developed in the front and rear areas of the impeller. The rear plate of the impeller has the fully developed pressures of genreated forces across its entire diameter. The front of the impeller has a large suction action of 0 or negative pressure, and a lower pressue from the outside diameter of the impeller to the suction inlet. This low pressure is caused by a front wearing ring which permits escapement of fluids from the impeller front face into the suction. It is desirable therefore to hav ea small pressure gradient to reduce or eliminate the pressure leakage back to suction.

The differential of the forces on the rear and the front of the impeller are of great magnitude, which must be neutralized to prevent forward thrust in all other canned motor pumps with the exception of Litzenberg, U.S. Pat. No. 4,065,231. In the prior art, thrust washers are often provided to handle the thrust forces, however, thrust washers do not neutralize the pressure differential and merely transfer the load to the thrust bearing against which the washer bears. The thrust washer method of handling thrust is inefficient since the washer's action is similar to that of a brake shoe, which wastes energy and causes the parts to wear which parts are costly to make and replace.

In addition should the fluid thrust balancing system fail, the thrust washers will get all the load which can quickly wear them out.

The bearings provided in the prior art pumps use a hard mechanical register, are difficult to install and remove, and do not self align, which causes added wear and shorter bearing life that available if the bearings were self aligning to compensate for small variations in the pump components, and applied forces. In my prior U.S. Pat. No. 5,009,578 automatic thrust balancing is provided, which while satisfactory is affected by the flow of cooling fluid. It is therefore desirable to have a system where the fluid flow for cooling, is inependent of the thrust balancing.

The motor driven pumps of my invention are not subject too prior art problems, and provide independently controlled cooling flow, and magnetic thrust balancing.

SUMMARY OF THE INVENTION

THis invention relates to motor driven pumps of the canned or isolated stator type, which include a center shaft, rotating shaft support bearings, controlled cooling flow and magnetic thrust balancing, each of which is controlled or regulated independently of the other.

The principal object of the invention is to provide canned or isolated stator motor driven pumps that have improved magnetic thrust balancing and a cooling flow system that operates independently of the thrust balancing.

A further object of the invention in to provide canned or isolated stator motor driven pumps that are easy to service.

A further object of the invention is to provide canned or isolated stator motor driven pumps that have improved bearing construction for extended service life.

A further object of the invention is to provide canned or isolated stator motor driven pumps wherein the thrust balancing feature is magnetic and not dependent on the pressure or flow of the cooling fluid.

A further object of the invention is to provide canned or isolated stator motor driven pumps which can cut off fluid for cooling flow from the hot fluid being pumped and is externally cooled.

A further object of the invention is to provide canned of isolated stator motor driven pumps that are durable and long lasting in operation.

A further object of the invention is to provide canned or isolated stator motor driven pumps that can only rotate the impeller in one direction.

A further object of the invention is to provide canned or isolated stator motor driven pumps that are useful for a wide variety of application and available in a large number of sizes.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several

DESCRIPTION OF THE PREFERRED EMBODIMIENT

Referring now more particularly to the drawings and FIGS. 1 to 5 thereof, a preferred embodiment of motor driven pump 10 in accordance with the invention is therein illustrated.

Figure 1:
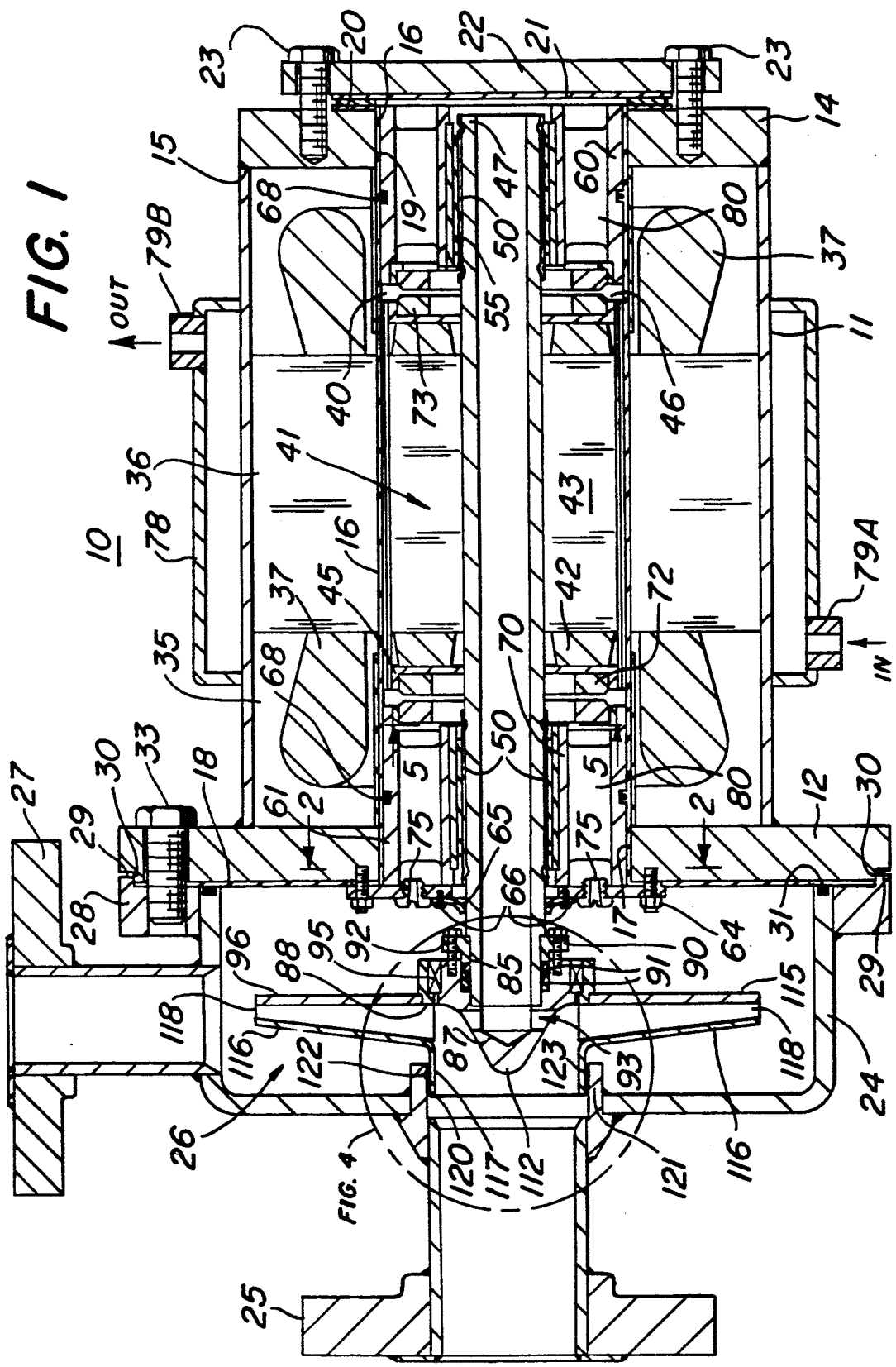
FIG. 1 is a longitudinal sectional view of a preferred embodiment of motor driven pump in accordance with the invention.

The pump 10 includes an outer cylindrical casing 11 welded or otherwise secured at the left hand end to a motor end plate 12 as seen in FIG. 1, and having another motor end plate 14 secured thereto at the right hand end by welding or otherwise. The end plate 14 is provided with a shoulder 15, which engages the casing 11 at its end thereof. The casing 11, and plates 12 and 14 are preferably constructed of steel or other suitable material.

A hollow cylindrical inner sleeve 16 is provided, preferably of stainless steel or other non-magnetic responsive metal, and which is not subject to corrosion by the pumped liquids.

The sleeve 16 extends through an opening 17 in the end plate 12, which plate 12 has an additional liner plate 18 welded or otherwise secured thereto on the outside of plate 12. The liner plate 18 can be of any desired material. such as stainless steel or other suitable material, which is resistant to, or not subject to corrosion by the pumped liquids.

The sleeve 16 also extends through an opening 19 in the end plate 14. An end liner plate 20 is provided of similar material to plate 18, with a gasket 21 between it and an end closure plate 22, which plate is secured to the end plate 14 by bolts 23, and closes off the opening 19 of end plate 14.

An impeller housing 24 is provided, having an axially disposed fluid inlet 25 for connection to an inlet pipe (not shown), an impeller chamber 26 of concnetric shape, and a fluid delivery outlet connection 27 from which a pipe (not shown) extends.

The impeller housing 24 can be of any desired material which is resistant to corrosion by the liquids being pumped, and for this purpose can be made of stainless steel, titanium or the like. The impeller housing 24 has a flange plate 28, which has a cylinderical face 29 adapted to engage with an outer cylindrical face 30 of the end plate 12. An O-ring, or other sealing strip 31 of rubber, natural or synthetic, or other like compressible or resilient material and resistant to the liquids being pumped, is carried in the housing 24 and in contact with liner plate 18, where it is compressed in to be in fluid tight condition, by bolts or studs 33, which extend through the end plate 12 and are in threaded engagement in the flange plate 28.

The space between the casing 11, the sleeve 16, the motor end plate 12, and the motor end plate 14 provides a sealed and isolated motor stator chamber 35. The chamber 35, as illustrated, has motor field laminations 36 and motor field windings 37 therein of well known type, which are sealed from contact with the liquids being pumped.

Conductors (not shown) for energizing the motor windings 37 are provided, which extend through a fluid tight seal in casing 11, (not shown) and are connected to any suitable source of electrical power (not shown).

The space within the interior of the sleeve 16 provides a motor rotor chamber 40.

A motor rotor 41 is provided in the chamber 40, and while it may be of any desired type, it is preferably of the induction type, with end rings 42 and laminations 43, and with a hollow can or cover 44 for protection.

The cover 44 is spaced inwardly from sleeve 16 to permit fluid flow therebetween, to be described.

The cover 44 has end cover plates 45 and 46 secured thereto in well known fluid tight manner, and which engage a hollow center shaft 47 to which they are also secured in well known fluid tight manner. The can or cover 44, and plates 45 and 46 are constructed of any suitable material such as stainless steel, which is resistant to the temperatures and corrosive action of the liquids being pumped.

The shaft 47 extends outwardly beyond the rotor end cover plates 45 and 46, and has sleeve bearings 50 mounted thereto by dimples 51 in the bearings 50, which are engaged in depressions 52 in shaft 47. The bearings 50 are preferably constructed of any suitable lightweight metal, which is resistant to the temperatures and corrosive action of the liquids being pumped, and include sacrificial material thereon, such as a wear resistant layer 55 of teflon or other suitable material on the outside of bearings 50 which layer is sacrificial to the extent necessary.

The bearings 50 rotate in adaptors 60 and 61 at each end, adaptor 60 engaging end plate 14, and adaptor 61 engaging end plate 12 and adaptor 61 engaging metering closure plate 63, which closes off opening 17 in end plate 12 to which it is secured by bolts 64. The plate 63 also has a lip seal 65, which is fastened thereto by bolts 66 as shown more clearly in FIG. 3, and which engages shaft 47 to reduce fluid leakage thereby.

The adapters 60 and 61 are each fitted with an O-ring 68, which engages the sleeve 16, for retention, to prevent rotation and to permit the adaptors 60 and 61 to rock in sleeve 16, to accommodate minor alignment requirements associated with the shaft 47 and bearings 50. In addition, when the adaptors conform to and align with shaft 47, bearing wear is decreased. The adaptors 60 and 61 each also include a sleeve 70, which engages the wear layers 55 of the bearings 50. The sleeves 70 are formed of any suitable hardened material which is temperature and corrosion resistant to the liquids being pumped, has a smooth surface finish and is compatible with the wear layers 55.

The adaptors 60 and 61 each has a ring 72 of magnetic material attached thereto, facing the end cover plates 45 and 46 which have like rings 73 thereon facing rings 72. The rings 72 and 73 are arranged so that the magnetic fields generated repel each other to keep the motor rotor 41 and attached elements in a floating, thrust balanced condition, between the adaptors 60 and 61 which is independent of cooling fluid flow to be described.

Figure 2:
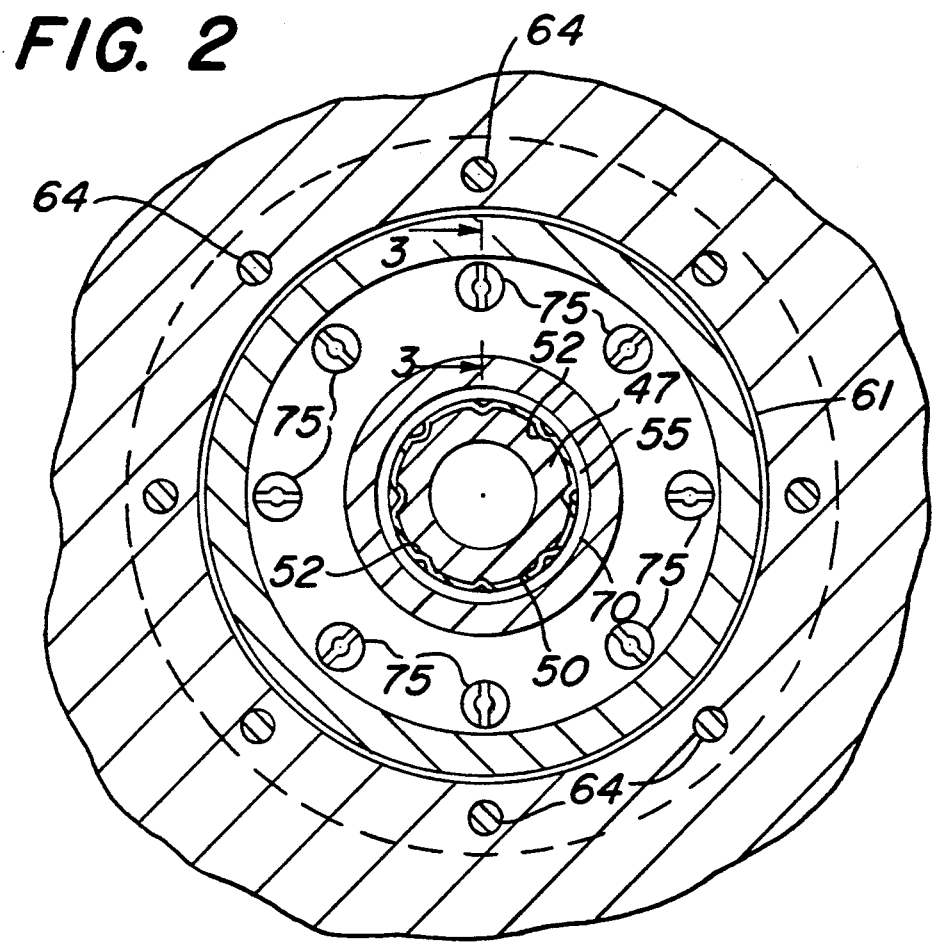
FIG. 2 is a fragmentary sectional view, enlarged, taken approximately on the line 2—2 of FIG. 1.
Figure 3:
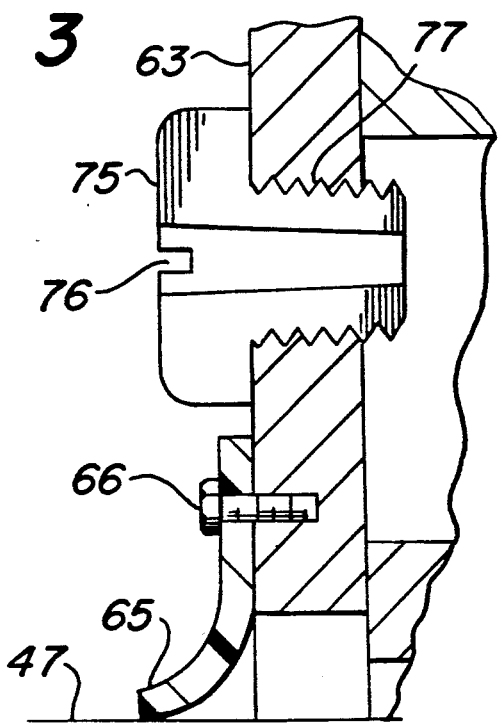
FIG. 3 is a fragmentary sectional view, further enlarged taken approximately on the line 3—3 of FIG. 2.
Figure 4:
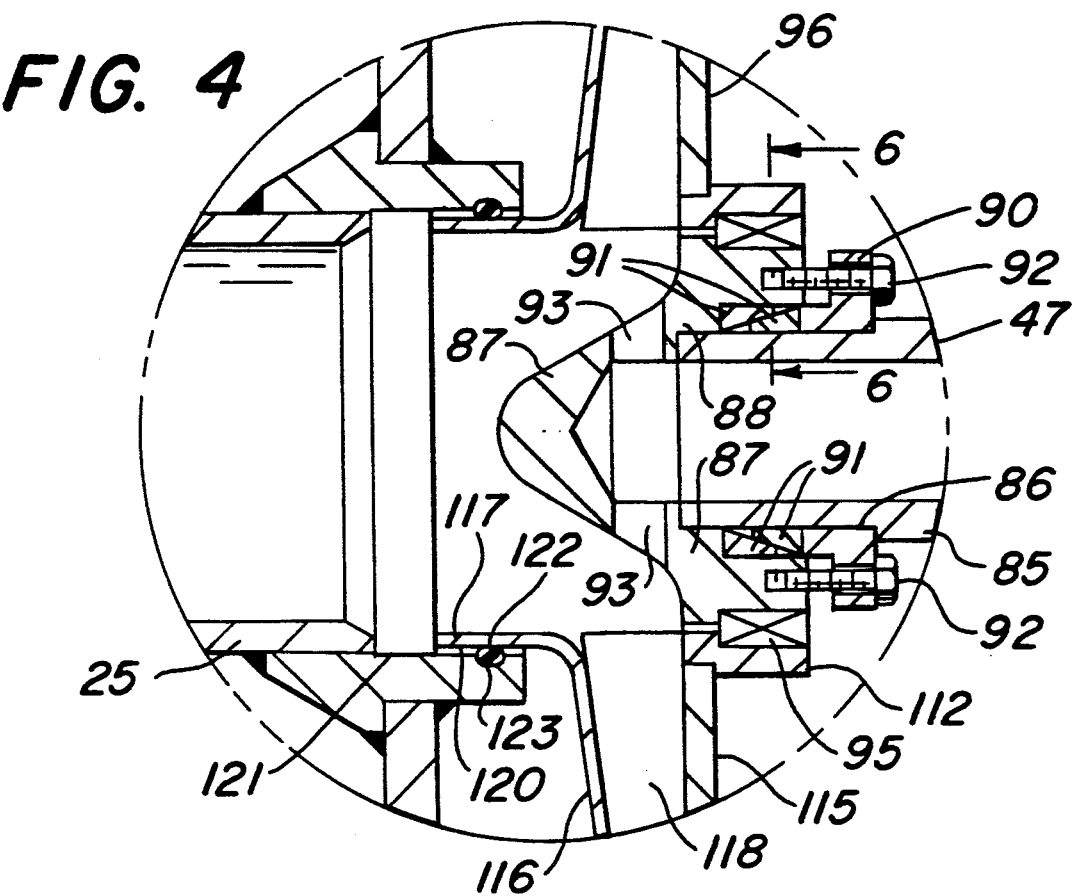
FIG. 4 is a fragmentary sectional view, enlarged, taken at the location FIG. 4 on FIG. 1.
Figure 5:
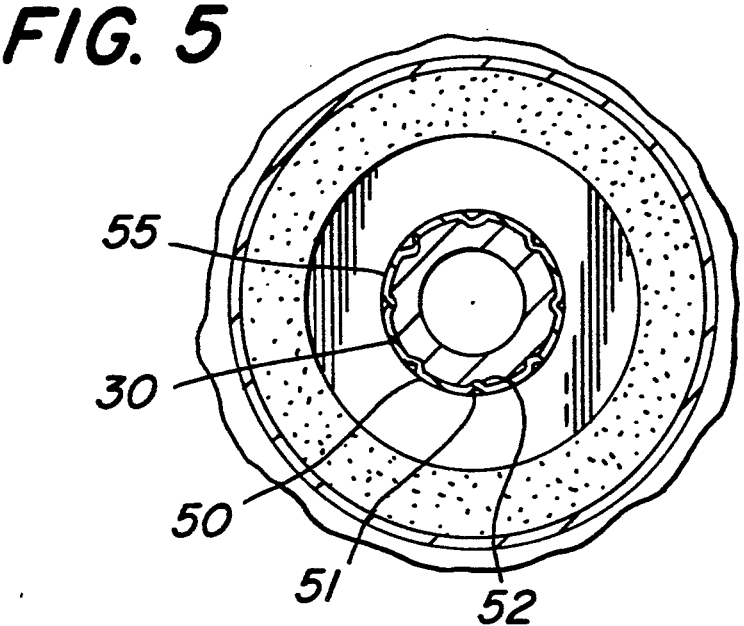
FIG. 5 is a fragmentary sectional view, enlarged, taken approximately on the line 5—5 of FIG. 1.

The metering closure plate 63 is provided with a plurality of variable orifices 75, eight being shown and illlustrated in detail in FIGS. 2 and 3. The variable orifices 75 are each provided with a fixed initial orifice 76, and have split tapered threads 77 which can be compressed by adjusting the position of the nozzles 75 in the plate 63, which changes the orifice size and therefore the flow of cooling fluid from impeller housing 24 into the interior of sleeve 16, by way of adaptors 60 and 61 which each have longitudinal passageways 80 for cooling fluid flow, to be described.

The orifices 75 can be closed off by fully tightening them in the plate 63 which prevents fluid flow into and out of the motor chamber 40, which may be necessary if the temperature of the pumped fluid is too high for cooling of the motor rotor and stator.

The outer cylindrical casing 11 has a cooling jacket 78 attached thereto, which is of metal and has a cooling fluid inlet 79A and a fluid outlet 79B which are connected to a source of cooling fluid (not shown) for use in high temperature applications.

The shaft 47 outside of plate 12 has an end portion 85 extending into the impeller chamber 24, and with a reduced diameter portion 86 which has a cylindrical hub 87 thereon. The hub 87 includes a cylindrical boss 88 which fits over the end portion 86 of shaft 47 and is retained thereon by a follower sleeve 90 on portion 86 which engages a pair of opposed rings 91 in a recess in boss 88 between it and reduced end portion 86. The follower sleeve 90 is urged toward rings 91 by bolts 92 engaged in boss 88 and sleeve 90 compressing the split rings 91, thereby retaining the boss 88 on end portion 86.

The boss 88 is provided with radial passageways 93 so that fluid from the shaft 47 can be returned to impeller chamber 26.

Figure 6:
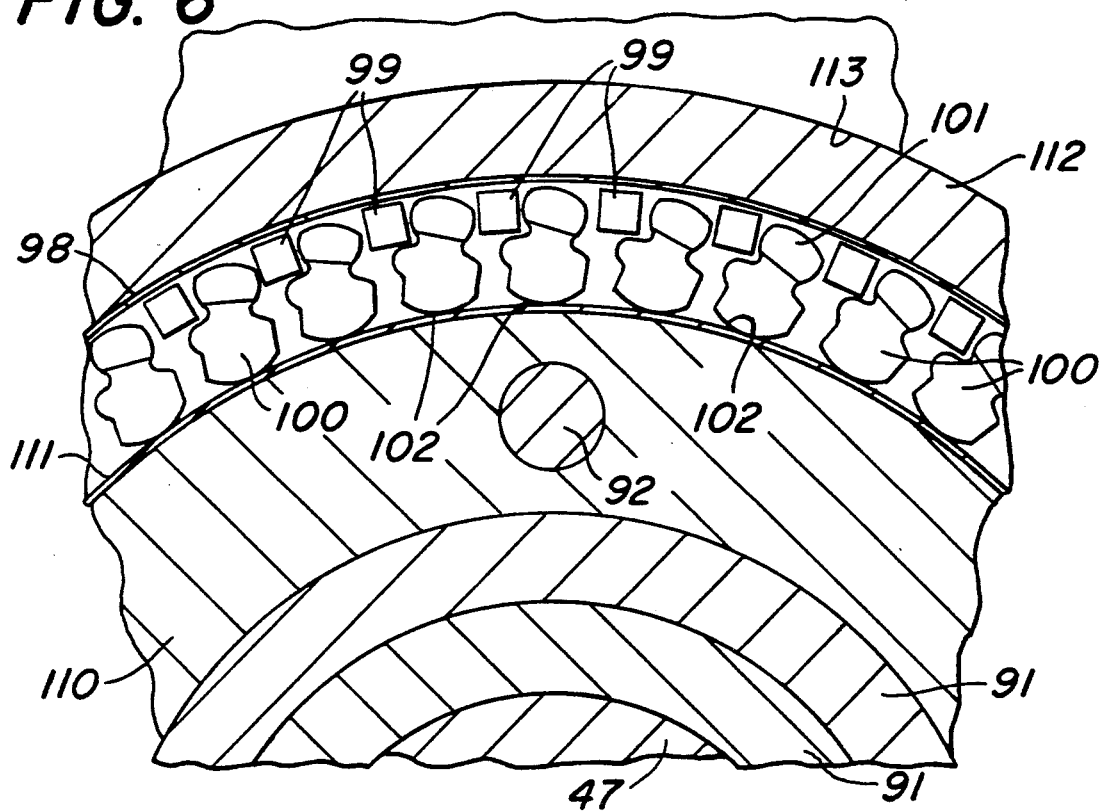
FIG. 6 is a fragmentary on the line 6—6 of FIG. 4, showing the one way clutch portion of the invention in nuetral position.
Figure 7:
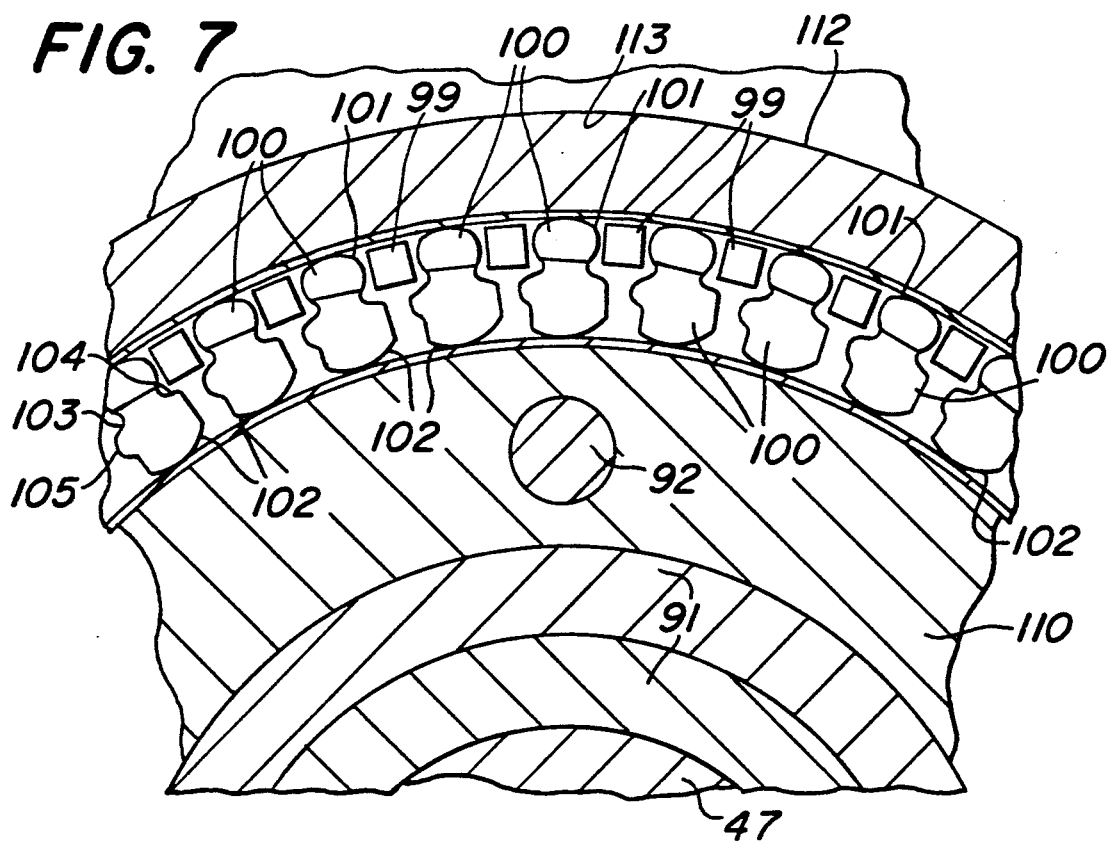
FIG. 7 is a view similar to FIG. 6 showing the one way clutch in engaged condition.

A one way or over-running clutch assembly 95 is provided between hub 87 and an impeller 96. The clutch assembly 95 includes, as illustrated in FIGS. 6 and 7, a pair of rings 98, connected together at spaced locations by a plurality of rods 99, spacing the rings 98 apart, and with a plurality of sprags 100 between the rods 99. The sprags 100 as illustrated each have top and bottom surfaces 101 and 102, left hand and right hand projections 103 and 104 and a cam corner 105.

The one-way clutch assembly 95 as illustrated is old in the art and available from a number of suppliers such as Dana Corp. of South Beloit, Il.

The hub 87 has an outer reduced diameter portion 110 with a hardened steel race 111 thereon. The impeller 96 includes a hub 112 with a hardened steel race 113 thereon. The clutch assembly 95 is located between the clutch races 110 and 113 with the sprags 100 in neutral position as illustrated in FIG. 6 and in engaged position as illustrated in FIG. 7.

The impeller 96 includes a side plate 115 extending from hub 112, which has disposed substantially parallel thereto another impeller plate 116, the inner cylindrical portion 117 of which extends toward the inlet 25 for directing the entering fluid between the plates 115 and 116.

The plates 115 and 116 have a plurality of curved vanes 118 extending therebetween, which direct the pumped liquid outwardly for discharge through the outlet connection 27.

the openings 93 communicate with the interior of the shaft 47 to retgurn fluid to the impeller 96.

The impeller 96 also has a cylindrical portion 120 which extends to and is engaged with a cylindrical extension 121 of inlet 25 with an O-ring 122 engaged in groove 123 in extension 121, to limit the flow of fluid therebetween and to provide a bearing.

The mode of operation will now be pointed out.

Upon energization of the windings 37, a rotating field is set up in the laminations 36, which is effective on the rotor 41 to rotate the shaft 47.

Fluid to be pumped is supplied through a pipe (not shown) to the fluid inlet 25, and enters the impeller 96 between the impeller plates 115 and 116.

The main body of the fluid being pumped is impelled outwardly by the vanes 118, and is directed by the interior of the chamber 26 to the delivery outlet connection 27.

A portion of the fliud flows through the variable orifices 75, into the motor rotor chamber 40 for cooling, by way of passageways 80 in adaptor 61 and then flows in the clearance between the magnetic rings 72 and 73 and then between the cover 44 and the sleeve 16, and through the clearance between the magnetic rings adjacent adaptor 60 and through passageways 80 in adaptor 60 into shaft 47, and through the openings 119 of the impeller 96 for discharge between vanes 118.

Since the motor rotor 41 is sensitive to electrical forces, is subject to axial thrust displacement reaction to fluid flow, and to the magnetic forces from rings 72 and 73, the shaft 47 moves axially towards an equilibrium position that is independent of the cooling fluid flow, and maintained regardless of the supply or lack of supply of fluid.

The bearings 50 can be easily removed for replacement by removing end closure plate 22 and adaptor 60. The bearing 50 adjacent to impeller 96 can also be easily removed for service by removing impeller 96 metering closure plate 63 and adaptor 61.

If required the amount of cooling fluid in the motor rotor chamber 40 can be varied by adjusting the position of the variable orifices 75 in plate 63, which will not appreciably affect the thrust balancing of rotor 41, and when closed entirely to prevent hot fluid from flowing therein, cooling fluid can be introduced into jacket 78 to cool the motor stator and motor rotor.

The one way clutch assembly 95 permits the impeller 96 to be rotated in one direction only, which reduces the likelihood of damage to the pump components and provides a check on the correct operation of the pump.

It will thus be seen that structure has been provided with which the objects of the invention are achieved.

I claim:

1. A motor driven pump which;
    includes an impeller housing having inlet and delivery connections and having an impeller chamber with an impeller therein, an outer cylindrical casing connected to said impeller housing, and having end plates, one of which is a cylindrical sleeve extending between said end plates and providing therewith and with said outer casing an isolated motor stator chamber, a motor stator in said stator chamber, the interior of said sleeve providing a motor rotor chamber, the improvement which comprises
    first and second adaptors removably mounted within said sleeve at opposite ends thereof,
    said first adaptor being mounted adjacent said impeller and said second adaptor being mounted at the end opposite thereto,
    said adaptors being provided with O-ring means to permit limited axial alignment,
    said connecting end plate having a metering closure plate thereon,
    said metering closure plate having at least one variable orifice therein,
    said first adaptor having at least one passageway therealong connecting the interior of said sleeve to said impeller chamber through said variable orifice permitting controlled cooling fluid flow therethrough,
    a hollow shaft having sleeve bearings secured thereton, carried in said first and second adaptors, and extending into said impeller chamber, said impeller being mounted to said shaft in said impeller chamber,
    a motor rotor on said shaft between said bearings in said motor rotor chamber,
    said first and second adaptors have sleeves therein engaged with said bearings carried by said shaft,
    automatic thrust balancing means for balancing the axial forces on said shaft which includes,
    first magnetic ring means mounted on said adaptors facing said rotor and second magnetic ring means mounted on the ends of said rotor facing said adaptor ring means,
    said first and second magnetic ring means being arranged so that they repel each other whereby said rotor is automatically maintained in a thrust balanced condition.

2. A motor driven pump as defined in claim 1 in which;
    said sleeve bearings are comprised of a hollow sleeve with a layer of wear resistant material thereon, and
    said sleeve bearings have dimples thereon and said shaft has like indentations whereby said bearings are retained on said shaft.

3. A motor driven pump as defined in claim 1 in which;
    said impeller is connected to said shaft by a one way clutch assembly.

4. A motor driven pump as defined in claim 1 in which;
    a jacket is provided attached to the outside of said outer cylindrical casing, and
    a source of cooling fluid is attached to said jacket to cool said motor stator and said motor rotor upon demand.

* * * * *

UNITED STATES PATENT AND TRADEMARK OFFICE
CERTIFICATE OF CORRECTION

PATENT NO. : 5,129,795

DATED : July 14, 1992

INVENTOR(S) : George J. Hyland

It is certified that error appears in the above-identified patent and that said Letters Patent is hereby corrected as shown below:

olumn 1
    Line 27, "pumnp" should be --pump-- olumn 2
    Line 15, "purposed" should be --purposes--
    Line 38, "seriosly" should be --seriously--
    Line 41, "hand" should be --and--
    Line 45, "genreated" should be --generated--
    Line 48, "pressue" should be --pressure--
    Line 52, "hav ea" should be --have a-- olumn 3
    Line 7, "that" should be --than-- olumn 4
    Line 7, words missing after the word fragmentary should say --is a fragmentary sectional view, further enlarged, taken approximately-- olumn 7
    Line 1, "the" should be --The--
    Line 2, "retgurn" should be --return--

Signed and Sealed this

Twenty-eighth Day of September, 1993

Attest:

BRUCE LEHMAN

Attesting Officer      Commissioner of Patents and Trademarks